United States Patent Office 3,637,907
Patented Jan. 25, 1972

3,637,907
POLYOLEFINS STABILIZED WITH DIPHOSPHINES
Ronald D. Mathis, Bartlesville, Okla., and Leslie T. Netherton, Fayetteville, Ark., assignors to Phillips Petroleum Company
No Drawing. Filed Feb. 26, 1969, Ser. No. 802,660
Int. Cl. C08f 29/10, 45/58
U.S. Cl. 260—857 L                    6 Claims

ABSTRACT OF THE DISCLOSURE

The stability of polyolefins is improved by adding a small amount of an alkylene diphosphine.

---

This invention relates to a polyolefin composition and has for an object the provision of a polyolefin stabilized against the effects of heat and light.

It is the practice in the art to treat polyolefin compositions in a manner such that they have enhanced stability against the deteriorating effects of heat and ultraviolet light. Such enhanced stabilization is desired so that the polyolefin composition will tend to maintain its color and luster and certain of its desired physical properties even though heated to elevated temperatures during normal processing or use or exposed to sunlight. In the past it has been proposed that certain additives be incorporated with the polyolefin for this purpose.

Accordingly, a further object of this invention is the provision of a polyolefin composition containing a substance which acts to stabilize the polyolefin against deterioration due to the effects of heat and ultraviolet light.

A further object of this invention is the provision of a polyolefin product having improved luster and color.

A still further object of this invention is the provision of a composition which is resistant to change in color and strength upon heating or aging.

Further and additional objects will appear from the following description and accompanying claims.

In accordance with this invention a polyolefin composition having improved stability against the effects of heat and light is provided by the incorporation therewith of an alkylene diphosphine. The alkylene diphosphines which are employed in accordance with this invention are those having the formula

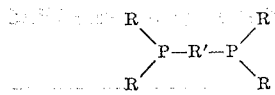

wherein R' is an alkylene group having from two to four carbon atoms and R is selected from thhe group consisting of alkyl having from one to twelve carbon atoms; phenyl; naphthyl; cyclopentyl; cyclohexyl; and alkyl substituted phenyl, naphthyl, cyclopentyl or cyclohexyl containing up to three alkyl substituents, each of which latter has from one to twelve carbon atoms. In a preferred embodiment of this invention, all of the R groups in the above-indicated phosphine are the same. Suitable examples of the compounds that may be used in accordance with this invention are the following:

Ethylene bis(diphenylphosphine)
Ethylene bis(di-3-methylcyclopentylphosphine)
Methylethylene bis(dicyclohexylphosphine)
Trimethylenebis(di-4-dodecylphenylphosphine)
Tetramethylene bis(dimethylphosphine)
2-methyltrimethylene bis(didodecylphosphine)
1-methyltrimethylene bis(di-m-tolylphosphine)
Tetramethylene bis(di-4-dodecylcyclohexylphosphine)
1,2-dimethylethylene bis(di-1-naphthylphosphine)
1,1-dimethylethylene bis(di-4-propyl-1-naphthylphosphine)
Ethylethylene bis(di-7-octyl-2-naphthylphosphine)
Ethylene bis(di-2,4,6-trimethylphenylphosphine)
Ethylene bis(di-3,5-dibutylcyclohexylphosphine)

If desired, mixtures of several compounds of the class indicated may be employed. Generally speaking, the amount of the alkylene diphosphine necessary to provide effective stabilization is between about .01 and 3 pounds of the phosphine per 100 pounds of the polyolefin to which the phosphine is added.

The class of alkylene diphosphines comprehended as stabilizers within the scope of this invention are per se known to the art. They may be synthesized by reacting a secondary phosphine having the formula $R_2PH$ with an alkylene dihalide having the formula $XR'X$ in which R and R' have the values previously indicated and in which X is a halogen such as bromine. Such a method is suggested by French Pat. No. 1,514,907. Another method for synthesizing this class of alkylene diphosphines is shown in Chem. Ber. 92, 3175–82 (1959). This method involves the reactions:

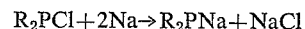
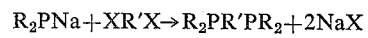

where again R, R' and X have the values previously assigned.

The polyolefins stabilized in accordance with the teachings of this invention include those polymers prepared by the polymerization of propylene, ethylene, 1-butylene, 1-amylene, 1-hexylene or mixtures thereof. Furthermore, as is well known to the art, other additives may also be incorporated into polymer to impart other desired properties. Any suitable method can be employed for incorporating the above indicated additives of this invention into the polymers and they may be incorporated simultaneously with other additives in combination. Several such methods are well known. For example, the combined additives can be sprayed on the polymer powder from solution (e.g., in acetone) prior to pelletizing. In a particularly suitable method, stabilized blends are prepared by dry blending the additives with the polymer, for example, in a powder blender, and thereafter, mechanically working the resulting dry blend at an elevated temperature, as for example, by milling at a temperature above about 200° F. or by extrusion or by mixing in a Banbury mixer or the like, e.g., at 300–360° F. Mixing can be carried out in an extruder, for example, so that the resulting composition is formed as pellets for supplying to the plastic molding industry.

For a more complete understanding of this invention, reference will now be made to several specific examples. In all of these examples the polypropylene used was a particulate polypropylene ("fluff") prepared by polymerizing propylene with a $TiCl_3 \cdot \frac{1}{3} AlCl_3$ + diethylaluminum chloride catalyst.

EXAMPLE 1

A first polyolefin composition was prepared by dry blending the following ingredients in a Henschel blender:

| Ingredient: | Parts by wt. |
|---|---|
| Polypropylene fluff (12MF) | 100 |
| Irganox 1093 | 0.15 |
| DSTDP | 0.30 |
| Tinuvin 328 | 0.50 |
| BHT | 0.05 |
| 4D6 | 4.0 |
| Titanium dioxide | 0.20 |

In the foregoing, the symbol MF represents melt flow as determined by ASTM D1238–62F, Condition L, and the unit measurement (i.e., 12) preceding the symbol expresses the value in dg./min. Irganox 1093 is di-n-octadecyl - 3,5 - di-tert-butyl-4-hydroxylbenzyl phosphonate; DSTDP is distearylthiodipropionate; Tinuvin 328 is 2-(2-hydroxy-3,5-dioctylphenyl)-2,1,3-benzotriazole; BHT is 2,6 - di-tert-butyl-4-methylphenol; and 4D6 is poly[1,3-di-(4-piperidyl)propane adipamide]. These substances are previously known as additives for polyolefins, the latter being disclosed and claimed in the copending application Ser. No. 640,186 of James W. Cleary, filed May 17, 1967 for "Dyeable Polyolefins" (now abandoned).

A second composition was prepared identical with the first except that to it was added 0.13 part by weight of ethylene bis(diphenylphosphine) to produce a composition formulated in accordance with this invention.

The yellowness index for knitted fabrics prepared from fibers formed from the two compositions was measured on an Instruments Development Laboratory Model D-1 Color Eye and the chromaticity values $X_{CE}$, $Y_{CE}$ and $Z_{CE}$ were determined. The yellowness index is equal to $100 \ (X-Z)Y$ and lower numbers indicate a better product. When subjected to this test the first composition without added phosphine had a yellowness index of 11.9 while the identical composition containing 0.13 part by weight of the phosphine (i.e., EDPP) had a yellowness index of 8.4, thereby demonstrating that EDPP reduced color development during processing of the polyolefin.

Further with respect to the second composition containing the added EDPP, it was found that this phosphine eliminates the problem of die pressure build-up (screen pack loading) which occurs when a prior art color improver such as dioctylphosphite (DOPI) is used. Thus, in one test the above-indicated second composition containing the EDPP showed a build-up in a die of 80 pounds pressure per hour while an identical composition in which an equal molar concentration (i.e., 0.10 part by weight) of DOPI was substituted for the EDPP exhibited a pressure build-up of 630 pounds per hour.

EXAMPLE 2

A first composition was prepared by dry blending the following ingredients in an Osterizer blender.

Ingredient: Parts by wt.
Polypropylene fluff (12MF) _____ 100
BHT _____ 0.07
DSTDP _____ 0.24
Topanol CA _____ 0.12
Cyasorb 531 (UV-531) _____ 0.60

In the above formulation the ingredients not previously identified in Example 1 are as follows: Topanol CA is 1,1,3 - tris(2-methyl-4-hydroxy-5-tert-butylphenyl)butane; and Cyasorb 531 (UV-531) is 2-hydroxy-4-n-octoxybenzophenone.

A second composition was prepared having a formulation in all respects identical with the first except that 0.10 part by weight dioctylphosphite (DOPI) was added, and a third composition was prepared also having a formulation identical with the first except that 0.10 part by weight of EDPP were added in accordance with this invention. These three compositions were tested as follows: Five grams of each polymer blend were charged into a melt indexer at 275° C. After five minutes at this temperature a one-minute cut was taken for melt flow determination. The $MF_{275}$ values for the first, second and third compositions were 38, 41 and 23, respectively, indicating that the third composition containing the EDPP had better thermal stability than the first and second compositions not containing this additive.

In addition, the first composition of this Example 2 containing no additive and the third composition containing the added EDPP were subjected to further tests to secure certain melt flow data, yellowness index data, and fiber elongation and tenacity data. The melt flow data for the fluff, pellets and fibers produced from these two compositions showed that the EDPP contributed to the thermal stability of the polymer during the formation of the pellets and subsequent spinning into fibers. The yellowness index data (8.3 and 7.6, respectively) for knitted material prepared from fibers formed from the two compositions showed that addition of EDPP reduced color development during processing of the material. The fiber tenacity and elongation data accumulated during extended exposure of fibers to ultraviolet light are given in Table I.

TABLE I

| | Tenacity half-life, hour [a] | Elongation retention, percent [b] |
|---|---|---|
| Composition: | | |
| First | 260 | 4 |
| Third | 350 | 12 |

[a] Tenacity is measured by drawing on an Instron at the rate of 100 percent per minute. By "half-life" is meant the time required for loss of half the initial tenacity.
[b] ASTM D638-61T, after 420 hours of exposure.

These data show that there was a greater retention of tenacity and of elongation in fibers prepared from compositions containing EDPP than those prepared from the composition without the added phosphine.

EXAMPLE 3

A first composition was prepared by dry blending the following ingredients in a Waring blender.

Ingredient: Parts by wt.
Polypropylene fluff (3MF) _____ 100
Irganox 1093 _____ 0.02
Calcium stearate _____ 0.05
Cyasorb 531 (UV-531) _____ 0.50
AM-101 _____ 1.50

The AM-101 ingredient is the nickel phenol-phenolate of bis(p-octylphenol)monosulfide.

A second composition was prepared identical with the first except that 0.10 part by weight of DOPI were added. A third composition was prepared identical with the first except that 0.70 part by weight of dilaurylthiodipropionate (DLTDP) were added. A fourth composition was prepared identical with the first except that 0.13 part by weight of EDPP were used. The melt flow values for each of these compositions obtained as indicated above in connection with Example 2 were 21, 30, 15 and 5, respectively, indicating the comparative effectiveness of the EDPP as a stabilizer against the deteriorating effects of heat on the polyolefin.

In the foregoing examples, additives other than the alkylene diphosphines are shown. All of these are previously known, the 4D6 additive being used to promote dyeability of the polyolefin and the other mentioned additives being known to the industry for various purposes and applications. Usually they are also present in concentrations of from about 0.01 to about 20 parts per 100 parts of polyolefin.

The stabilized polyolefins of this invention are suitable for use in making sheets, films or fibers by conventional techniques and may be extruded or injector molded to form a variety of articles, all as well known to the art.

While several particular embodiments of this invention have been specifically described and suggested in the foregoing, it will be apparent that modifications may be made without departing from the scope of this invention as set forth in the appended claims.

What is claimed is:
1. A polyolefin composition containing a stabilizing amount of a phosphine having the formula:

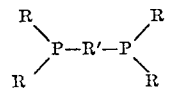

wherein R′ is an alkylene group having from two to four carbon atoms and R is selected from the group consisting of alkyl having from one to twelve carbon atoms; phenyl;

naphthyl; cyclopentyl; cyclohexyl; and alkyl substituted phenyl, naphthyl, cyclopentyl or cyclohexyl containing up to three alkyl substituents each of which latter has from one to twelve carbon atoms.

2. The composition of claim 1 in which all R groups are the same.

3. The composition of claim 1 in which the polyolefin is polypropylene.

4. The composition of claim 1 in which the amount of phosphine is between about .01 and 3 pounds per 100 pounds of polyolefin.

5. The composition of claim 1 which also contains a small amount of poly[1,3-di(4-piperidyl)propane adipamide].

6. The composition of claim 1 in which the phosphine is ethylene bis(diphenylphosphine).

References Cited

UNITED STATES PATENTS

| 3,163,492 | 12/1964 | Thomas | 8—55 |
| 3,255,151 | 6/1966 | Hecker et al. | 260—45.9 |
| 3,284,543 | 11/1966 | Gillham et al. | 260—887 |
| 3,371,068 | 2/1968 | Preston et al. | 260—78 |
| 3,433,853 | 3/1969 | Earle et al. | 260—857 |
| 2,867,594 | 1/1959 | Hansen et al. | 260—23 |
| 3,518,312 | 6/1970 | Maier | 260—606.5 |

DONALD E. CZAJA, Primary Examiner

R. A. WHITE, Assistant Examiner

U.S. Cl. X.R.

260—45.7 P, 45.75 N, 45.8 N, 45.85, 45.95